(12) United States Patent
Mizell et al.

(10) Patent No.: US 9,372,938 B2
(45) Date of Patent: Jun. 21, 2016

(54) AUGMENTING QUERIES WHEN SEARCHING A SEMANTIC DATABASE

(75) Inventors: David Mizell, Sammamish, WA (US); Christopher D. Rickett, Bloomington, IN (US); Andrew S. Kopser, Seattle, WA (US)

(73) Assignee: Cray Inc., Seattle, WA (US)

( * ) Notice: Subject to any disclaimer, the term of this patent is extended or adjusted under 35 U.S.C. 154(b) by 420 days.

(21) Appl. No.: 13/529,696

(22) Filed: Jun. 21, 2012

(65) Prior Publication Data

US 2013/0346445 A1 Dec. 26, 2013

(51) Int. Cl.
*G06F 7/00* (2006.01)
*G06F 17/00* (2006.01)
*G06F 17/30* (2006.01)

(52) U.S. Cl.
CPC ............................. *G06F 17/30908* (2013.01)

(58) Field of Classification Search
CPC ................. G06F 17/30448; G06F 17/30477; G06F 17/30557; G06F 17/30731; G06F 17/30864; G06F 17/30887; G06F 17/30908; G06F 17/30958; G06F 17/30277; G06F 17/30312; G06F 17/30392; G06F 17/30569; G06F 17/03
See application file for complete search history.

(56) References Cited

U.S. PATENT DOCUMENTS

| | | | |
|---|---|---|---|
| 7,836,097 B2 * | 11/2010 | Blackstone et al. | 707/803 |
| 8,756,246 B2 * | 6/2014 | Wu et al. | 707/769 |
| 2009/0287978 A1 * | 11/2009 | Tune et al. | 714/752 |
| 2010/0241644 A1 * | 9/2010 | Jackson et al. | 707/760 |
| 2011/0196852 A1 * | 8/2011 | Srikanth et al. | 707/706 |
| 2012/0215768 A1 * | 8/2012 | Zellweger | 707/722 |
| 2012/0303668 A1 * | 11/2012 | Srinivasan et al. | 707/792 |

OTHER PUBLICATIONS

Arenas, Marcelo, "Querying Semantic Web Data with SPARQL," ACM, PODS '11, Jun. 13-15, 2011, pp. 305-316.
Goodman, Eric L. et al., "High-performance Computing Applied to Semantic Databases," ESWC '11, Proceedings of the 8th Extended Semantic Web Conference on the Semanic Web: Research and Applications—vol. Part II, Springer-Verlag Berlin, Heidelberg, 2011, pp. 31-45.
Hull, Richard et al., "Semantic Database Modeling: Survey, Applications, and Research Issues,", ACM Computing Surveys, vol. 19, Issue 3, Sep. 1987, pp. 201-260.

* cited by examiner

*Primary Examiner* — Susan Chen
(74) *Attorney, Agent, or Firm* — Perkins Coie LLP

(57) ABSTRACT

A method and system for identifying results of a query that includes a type predicate is provided. A search system maintains a collection of facts that includes a triple for each fact and a type table that maps entities of the facts to their corresponding type. The search system uses the type table to speed up the process of identifying the search results when the query includes a non-type query triple and a type query triple. A type query triple is a triple that has a type predicate, rather than a non-type predicate. To execute a query that contains a non-type query triple and a type query triple, the search system identifies the triples of the collection that match the non-type query triple. The search system then uses the type table to determine which of the identified triples match the type query triple for inclusion in the search results.

4 Claims, 10 Drawing Sheets

FIG. 2 fact table 210

| subject | predicate | object |
|---|---|---|
| John Smith | degree | MD |
| Bill Greene | degree | JD |
| Tom Jones | degree | MD |
| John Smith | is-a | politician |
| John Smith | is-a | college graduate |
| John Smith | graduate of | University of Washington |
| Bill Greene | is-a | politician |
| JD | is-a | law degree |
| JD | is-a | graduate degree |
| ... | ... | ... |

211 — 212 type table 220

| entity | types |
|---|---|
| John Smith | politician, college graduate, ... |
| Bill Greene | politician |
| JD | law degree, graduate degree |
| ... | ... |

221

200

AUGMENTING QUERIES WHEN SEARCHING A SEMANTIC DATABASE

BACKGROUND

Semantic data models allow relationships between resources to be modeled as facts. The facts are often represented as triples that have a subject, a predicate, and an object. For example, one triple may have the subject of "John Smith," the predicate of "is-a," and the object of "physician," which may be represented as <John Smith, ISA, physician>.

This triple represents the fact that John Smith is a physician. Other triples may be <John Smith, graduate of, University of Washington> representing the fact that John Smith graduated from the University of Washington and <John Smith, degree, MD> representing the fact that John Smith has an MD degree. Semantic data models can be used to model the relationships between any type of resources such as web pages, people, companies, products, meetings, and so on. One semantic data model, referred to as the Resource Description Framework ("RDF"), has been developed by the World Wide Web Consortium ("W3C") to model web resources, but it can be used to model any type of resource. The triples of a semantic data model may be stored in a semantic database that may include a fact table containing the triples representing the facts.

To search for facts of interest, a user may submit a query to a search engine and receive as results the facts that match the query. A query may be specified using SPARQL, which is a query language that has been developed for semantic databases that comply with the RDF format. The acronym "SPARQL" stands for "Simple Protocol and RDF Query Language." A SPARQL query may include a "select" clause and a "where" clause as shown in the following example:

```
select ?profession
where {
    ?x    degree    ?profession}.
```

The select clause includes the variable "?profession," and the where clause includes the query triple with the variable "?x" as the subject, the non-variable "degree" as the predicate, and the variable "?profession" as the object. When a search engine executes this query, it identifies all triples of the database that match the non-variable(s) of the query triple. In this example, the search engine identifies all triples with a predicate of "degree" and returns the objects of those identified triples based on the variable "?profession" being in the select clause and in the object of the query triple of the where clause. For example, the search engine will return "MD" and "JD" when the database contains the following facts:

<John Smith, degree, MD>
<Bill Greene, degree, JD>.

If the select clause had also included the variable "?x," then the search engine would have returned "John Smith, MD" and "Bill Greene, JD."

SPARQL allows multiple query triples to be included in the where clause to create more queries such as the following example query:

| select | ?profession | | | |
|---|---|---|---|---|
| where | | | | |
| | ?x | degree | ?profession | (Example1) |
| | ?x | livesin | USA | |
| | ?x | citizenof | USA | |
| | ?x | is-a | professor | |
| | ?profession | is-a | law degree. | |

This example query will return the various law degrees of professors who are U.S. citizens and who live in the United States, such as a B.S. in legal studies, a J.D., and an LL.M.

To identify the results for a query, a search engine identifies the triples that match each query triple. A triple matches a query triple when the triple matches each defined or non-variable element of the query triple. When a triple matches, its values are bound to the variables of the query triple. A search engine generates the results by taking intersections of the values bound to the variables of the query triples. In Example 1 above, because the where clause has five query triples, the search engine may identify five sets of triples. The first set will contain triples with the predicate "degree," the second set will contain triples with the predicate of "livesin" and the object of "USA," the third set will contain triples with the predicate of "citizenof" and the object of "USA," the fourth set will contain triples with the predicate of "is-a" and the object of "professor," and the fifth set will contain triples with the predicate of "is-a" and the object of "law degree." After generating the sets, the search engine identifies the triples of the first set whose subject is also the subject of a triple in the second, third, and fourth sets and then returns those identified triples whose object is also the subject of a triple in the fifth set.

Current collections of facts can contain billions of triples. As a result, the process of identifying a set of triples that match a query triple can be computationally expensive and very time-consuming. When a query has multiple query triples, a search engine may need to make multiple passes through the entire collection (e.g., with each pass accessing each triple)—one for each query triple. Even after the sets are identified, the search engine still needs to identify the subset of triples that match all the query triples.

BRIEF DESCRIPTION OF THE DRAWINGS

FIG. 2 is a block diagram illustrating the data structures of the search augmentation system in some embodiments.

DETAILED DESCRIPTION

Figure 1:
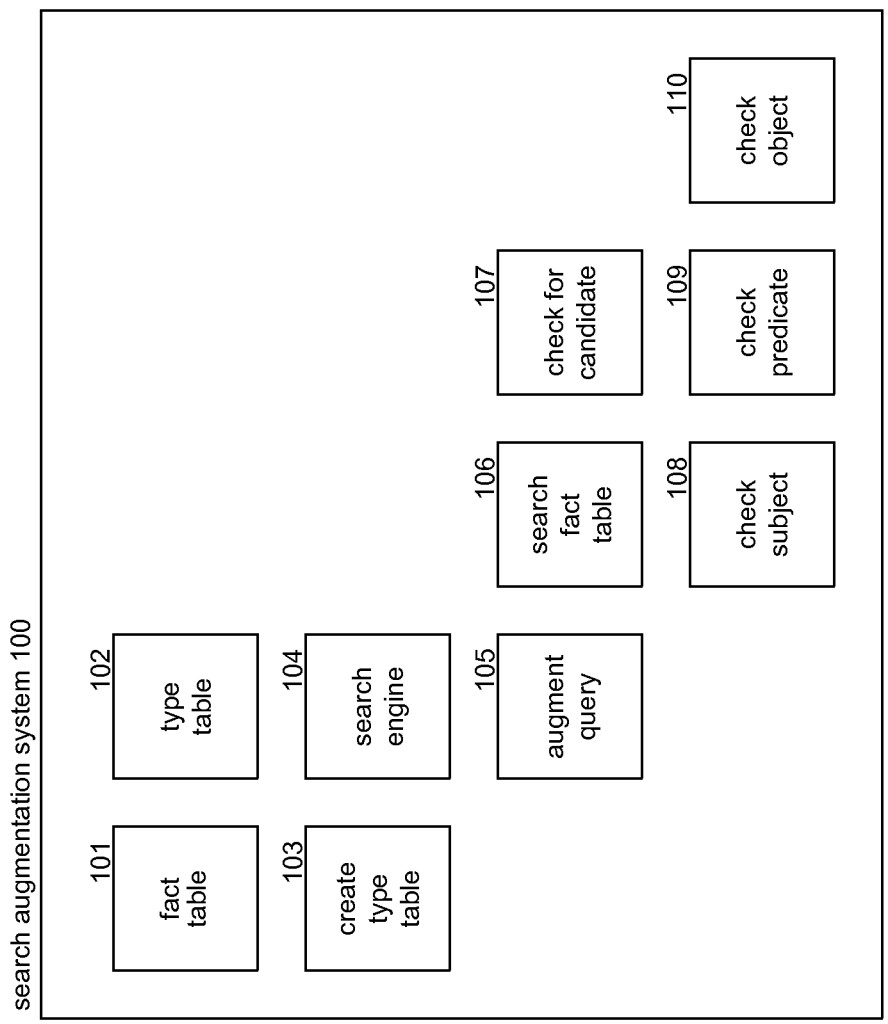
FIG. 1 is a block diagram that illustrates components of the search augmentation system in some embodiments.

A method and system for identifying results of a query that includes a type predicate is provided. In some embodiments, a search augmentation system maintains a collection of facts that includes a triple for each fact and a type table that maps entities of the facts to their corresponding type. For example, each fact may represent a triple that includes a subject, a predicate, and an object with the subject and the object each being an entity. The type table may have an entry for each entity along with the types of that entity. For example, the type table may have an entry for the entity "John Smith" along with an indication of the types of person, lawyer, politician, and so on. The search augmentation system uses the type table to speed up the process of identifying the search results when the query includes a non-type query triple and a type query triple. A type query triple is a triple that has a type predicate, rather than a non-type predicate. Typically, a semantic data model will have one predicate that is a type predicate. Examples of a type predicate include the "RDF:type" predicate defined by the Resource Description Framework and the "is-a" or "is-a" predicate of object-oriented programming. A non-type predicate is any predicate other than a type predicate, such as the "degree," "livesin," and "citizenof" predicates described in the background section. To execute a query that contains a non-type query triple and a type query triple, a search engine of the search augmentation system identifies the triples of the collection that match the non-type query triple, which may include a pass through the entire collection of triples. The search engine then uses the type table to determine which of the identified triples match the type query triple for inclusion in the search results. As an example, when a query specifies the following query triples

| ?x | degree | MD |
| ?x | is-a | politician, | the search engine identifies the triples with the predicate of "degree" and an object of "MD" such as the following triples:

<John Smith, degree, MD>
<Tom Jones, degree, MD>.

For each identified triple, the search engine checks the type table to determine whether the subject of that triple has a type of "politician" and, if so, includes that triple in the results. In this example, if the type table indicates that John Smith is a politician but has no information indicating that Tom Jones is a politician, the search engine will include the identified triple for John Smith in the results but not the identified triple for Tom Jones. By using a type table to assist in processing a query, the search engine can avoid a pass through the entire collection to identify triples that match the type query triple of the query.

In some embodiments, the search augmentation system generates a type table by preprocessing the collection of facts to identify triples with a type predicate and adds an entry to the type table for each subject of an identified triple along with the objects of those identified triples. For example, when the collection of facts includes the triples <John Smith, is-a, politician>
<John Smith, is-a, professor>, the search augmentation system adds an entry to the type table that maps the entity "John Smith" to the types of "politician" and "professor." The search augmentation system may also remove the identified triples from the collection of facts because the information content of the triples with a type predicate is redundant with the information of the type table. The search augmentation system may use various data structures to organize the type table such as hash tables, tree structures, linked lists, sorted lists, and so on.

In some embodiments, the search augmentation system may augment the non-type query triples of a query with the types specified by the type query triples to form an augmented query triple. The search augmentation system may augment the query triple to include a subject type and an object type. An augmented triple thus includes a subject, a subject type, a predicate, an object, and an object type. For example, when a query specifies the following query triples of

| ?x | degree | MD |
| ?x | is-a | politician, | the search augmentation system generates an augmented query triple as follows:

| ?x(politician) degree | MD( ). |

In this example, the type information is shown in the parentheses. The augmented query triple specifies that the subject type is "politician" and that the object type is empty, indicating that no object type is specified. The process of augmenting a query triple may be also be referred to as "type stuffing" as type information is added to non-type query triples. In some embodiments, the search augmentation system may process queries that include multiple non-type query triples and multiple type query triples such as in Example 1. In such a case, the search augmentation system may augment each non-type query triple with multiple subject types and/or object types as specified by the type query triples. For example, if a query has the following query triples,

| ?x | degree | ?profession |
| ?x | is-a | professor |
| ?x | is-a | politician |
| ?profession | is-a | law degree, | the search augmentation system may generate the following augmented query triple.

| ?x(professor, politician) | degree | ?profession(law degree). |
|---|---|---|

Alternatively, the search augmentation system may allow only one subject type and object type per augmented query triple but may duplicate the augmented query triple with different subject types and object types as follows:

| ?x(professor)degree | ?profession(law degree) |
|---|---|
| ?x(politician) degree | ?profession(law degree). |

In such a case, the augmented query triple may be referred to as a query quintuple. The search engine identifies a set of triples for each augmented query triple and then combines the set to form the results of triples that match the query. For example, the augmented query of Example 1 may include the following augmented triples:

| ?x(professor)degree | ?profession(law degree) |
|---|---|
| ?x(professor)livesin | USA( ) |
| ?x(professor)citizenof | USA( ). |

The first set includes the triples for all professors with a law degree, the second set includes the triples for all professors that live in the United States, and the third set includes the triples for all professors that are U.S. citizens. The search engine may take the intersection of the first set and the second set based on the subject of the triples to give initial results. The initial results include triples for only those professors that have a law degree and that live in the United States. The search engine may then take the intersection of the initial results and the third set based on the subject of the triples to give the final results. Because of the select clause, the query of Example 1 returns degrees of the professors in the final results.

FIG. 1 is a block diagram that illustrates components of the search augmentation system in some embodiments. The search augmentation system 100 includes a fact table 101 and a type table 102 as described above. The search augmentation system also includes a create type table component 103, a search engine 104, an augment query component 105, a search fact table component 106, a check for candidate component 107, a check subject component 108, a check predicate component 109, and a check object component 110. The create type table component creates the type table from the triples of the fact table with a type predicate. The search engine receives a query with a non-type query triple and a type query triple, identifies triples of the fact table that match the non-type query triple, and uses the type table to filter out the identified triples that do not satisfy the type query triple. The augment query component augments a non-type query triple to include a subject type and/or object type as specified by the type query triple. The search fact table component receives an augmented query triple and returns the results for the augmented query triple. The check for candidate component is passed a triple and a query quintuple and returns an indication of whether the triple is a candidate for matching the query that contains the query quintuple. The check subject component, the check predicate component, and the check object component determine whether a triple is a candidate for matching a query based on subject, predicate, and object, respectively.

The computing system or computing devices on which the search augmentation system may be implemented may include a central processing unit and local memory and may include input devices (e.g., keyboard and pointing devices), output devices (e.g., display devices), and storage devices (e.g., disk drives). The processors may access computer-readable media that includes computer-readable storage media and data transmission media. The computer-readable storage media includes memory and other storage devices that may have recorded upon or may be encoded with computer-executable instructions or logic that implements the search augmentation system. The data transmission media is media for transmitting data using signals or carrier waves (e.g., electromagnetism) via a wire or wireless connection. Various functions of the search augmentation system may also be implemented on devices using discrete logic or logic embedded as an application-specific integrated circuit.

The computing system may comprise multiple nodes connected via a network interconnect. Each node may include one or more processors, local memory accessible to only the local processors, and a portion of a distributed memory that is accessible to the processors of other nodes. The search augmentation system may store the fact table and type table in the distributed memory. The nodes may send messages to other nodes to access subsets of the fact table and type table that are stored at the other nodes.

The search augmentation system may be described in the general context of computer-executable instructions, such as program modules, executed by one or more computers, processors, or other devices. Generally, program modules include routines, programs, objects, components, data structures, and so on that perform particular tasks or implement particular data types. Typically, the functionality of the program modules may be combined or distributed as desired in various embodiments.

FIG. 2 is a block diagram illustrating the data structures of the search augmentation system in some embodiments. The data structures 200 include a fact table 210 and a type table 220. The fact table includes an entry for each fact, and each fact includes a subject, a predicate, and an object. The type table includes an entry for each unique subject of each triple of the fact table with a type predicate. For example, the fact table includes the entries 211 and 212 with a type predicate and with the subject of John Smith:

| <John Smith, is-a, politician> |
|---|
| <John Smith, is-a, college graduate>. |

The type table includes an entry 221 mapping the entity John Smith to the types "politician" and "college graduate." As described above, the search augmentation system may remove each triple with a type predicate from the fact table as those triples are redundant with the information content of the type table. The search augmentation system may use indexing, hashing, or other techniques to facilitate retrieving an entry of the fact table for a certain subject.

Figure 3:
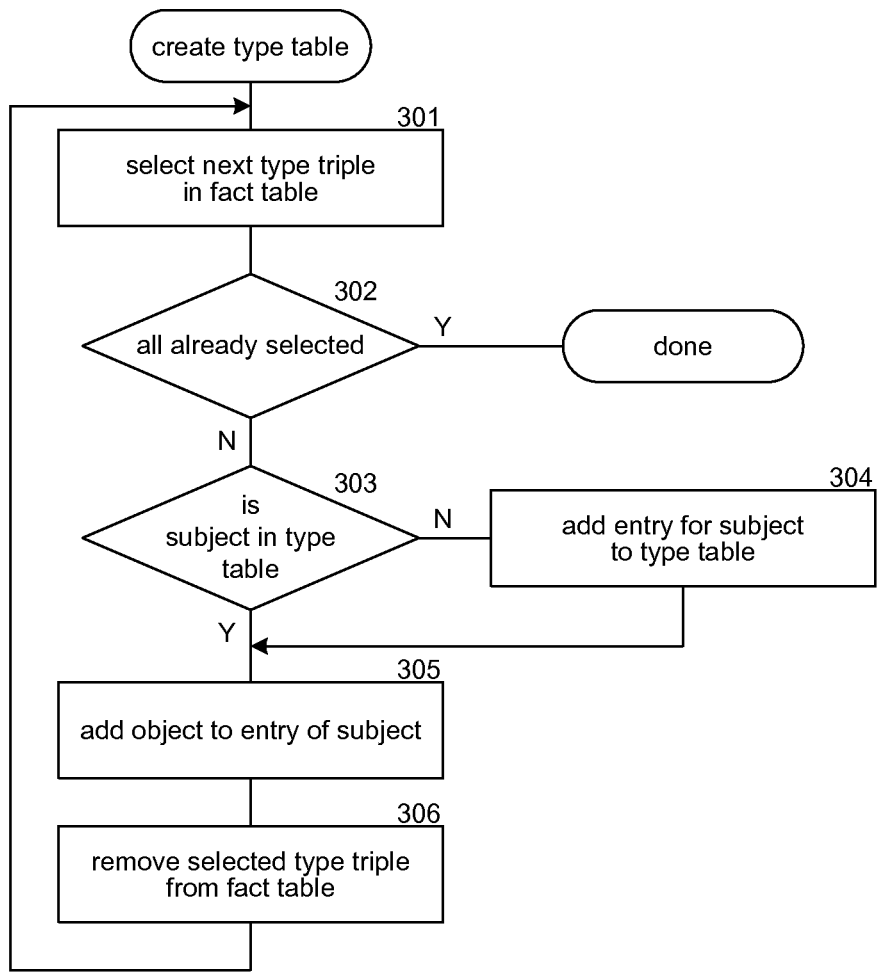
FIG. 3 is a flow diagram that illustrates the processing of the create type table component of the search augmentation system in some embodiments.

FIG. 3 is a flow diagram that illustrates the processing of the create type table component of the search augmentation system in some embodiments. The component may be invoked prior to processing any queries to create a type table for a specified fact table. In block 301, the component selects the next triple of the fact table with a type predicate. In decision block 302, if all such triples have already been selected, then the component completes, else the component continues at block 303. In decision block 303, if the subject of the selected triple already has an entry in the type table, then the component continues at block 305, else the component continues at block 304. In block 304, the component adds an entry to the type table corresponding to the subject of the selected triple. In block 305, the component updates the entry in the type table for the subject of the selected triple to indicate that the object of the selected triple is a type of that subject. In block 306, the component optionally removes the selected triple from the fact table and then loops to block 301 to select the next triple with a type predicate.

Figure 4:
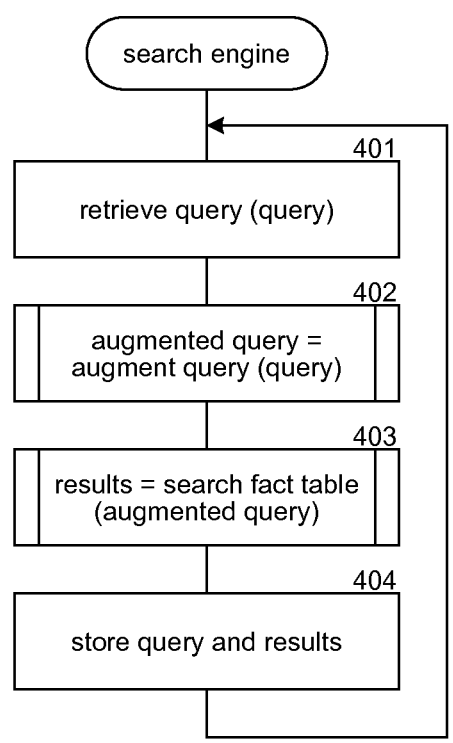
FIG. 4 is a flow diagram that illustrates the processing of a search engine of the search augmentation system in some embodiments.

FIG. 4 is a flow diagram that illustrates the processing of a search engine of the search augmentation system in some embodiments. The search engine may be launched as a process executing within a node of a multi-node computing network. The search engine may loop executing queries submitted by applications or other programs executing on the nodes of the computing network. The search engine may create a separate thread to execute each submitted query and may queue the queries for various reasons such as the search engine being busy executing other queries, the node being occupied performing higher priority tasks, and so on. In block 401, the component retrieves a submitted query. In block 402, the component invokes the augment query component, passing the retrieved query and receiving the augmented query in return. In block 403, the component invokes the search fact table component, passing the augmented query and receiving the results in return. In block 404, the component stores the query and the results and loops to block 401 to retrieve the next submitted query.

In some embodiments, the search engine of the search augmentation system receives a query that has a non-type query triple and a type query triple with the non-type query triple having a subject, a non-type predicate, and an object and the type query triple having a subject, a type predicate, and an object such that the subjects and objects are entities. The search engine then retrieves from the fact table triples that match the non-type query triple as results. For each retrieved triple, the search engine removes the retrieved triple from the results when a type for an entity (subject or object) of the retrieved triple is specified by the query and the type table indicates that that entity is not associated with that type.

Figure 5:
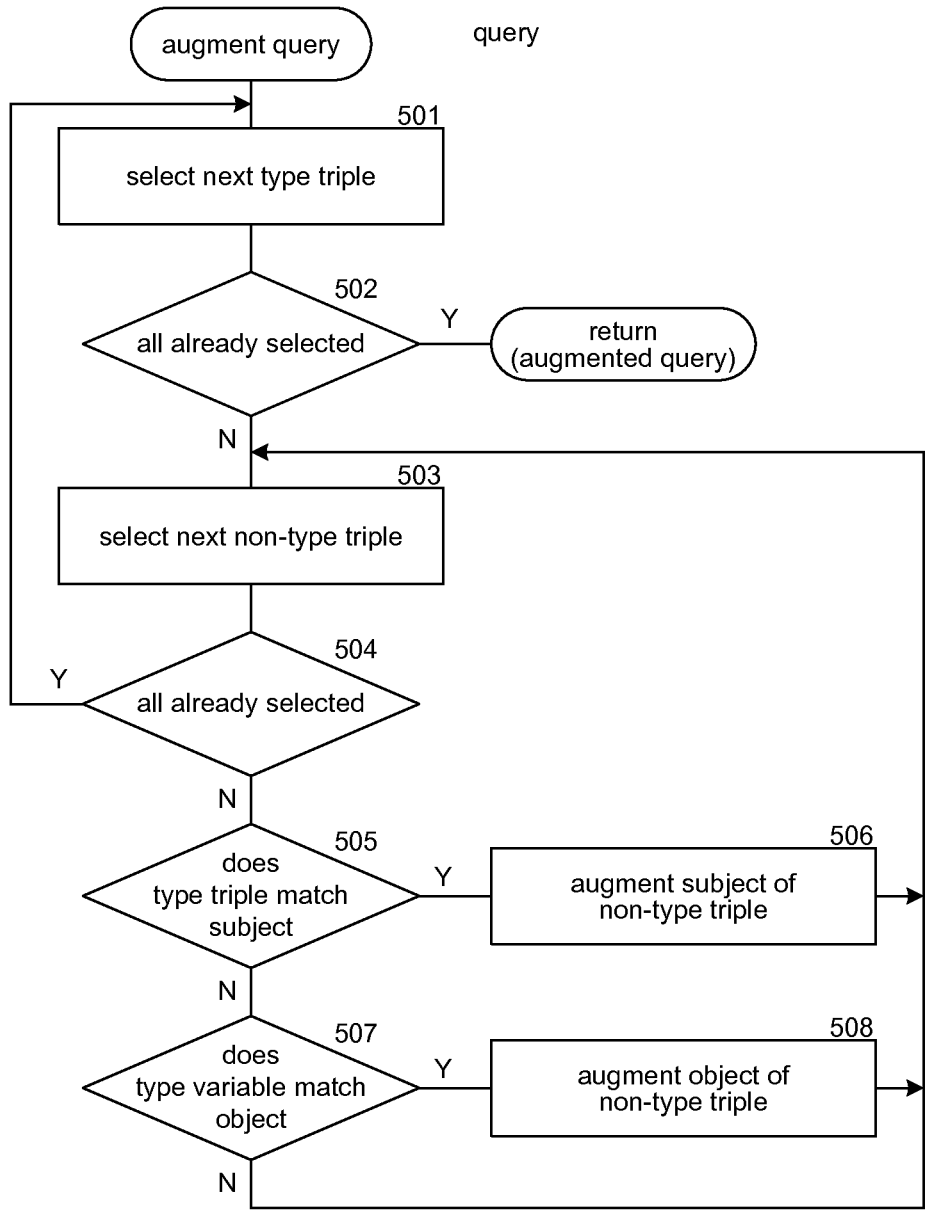
FIG. 5 is a flow diagram that illustrates the processing of an augment query component of the search augmentation system in some embodiments.

FIG. 5 is a flow diagram that illustrates the processing of an augment query component of the search augmentation system in some embodiments. The component is passed a query and returns an augmented query that includes type information as appropriate for each non-type query triple. In block 501, the component selects the next type query triple of the passed query. In decision block 502, if all the type query triples have already been selected, then the component returns the augmented query, else the component continues at block 503. In blocks 503-508, the component loops augmenting each non-type query triple with the type information of the selected type query triple as appropriate. In block 503, the component selects the next non-type query triple. In decision block 504, if all the non-type query triples have already been selected for the selected type query triple, then the component loops to block 501 to select the next type query triple, else the component continues at block 505. In decision block 505, if the variable of the subject of the selected type query triple matches a variable of the subject of the selected non-type query triple, then the component continues at block 506, else the component continues at block 507. In block 506, the component augments the non-type query triple to set the subject type to the object of the selected type query triple and then loops to block 503 to select the next non-type query triple. In decision block 507, if the variable of the subject of the selected type query triple matches a variable of the object of the selected non-type query triple, then the component continues at block 508, else the component loops to block 503 to select the next non-type query triple. In block 508, the component augments the selected non-type query triple to set the object type to the object of the selected type query triple and then loops to block 503 to select the next non-type query triple.

Figure 6:
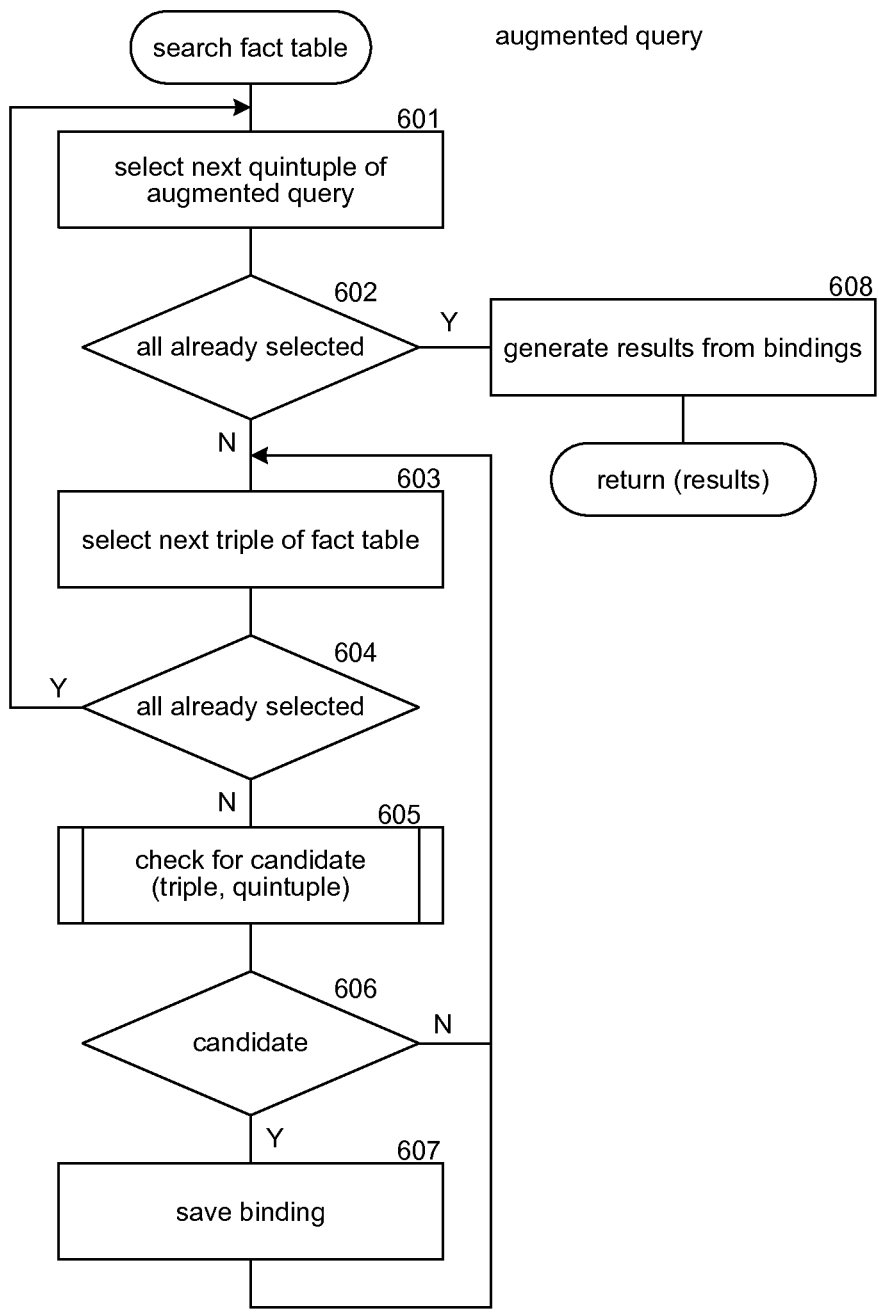
FIG. 6 is a flow diagram that illustrates the processing of a search fact table component of the search augmentation system in some embodiments.

FIG. 6 is a flow diagram that illustrates the processing of a search fact table component of the search augmentation system in some embodiments. The component is passed an augmented query and returns as results the triples of the fact table that match the augmented query. In block 601, the component selects the next augmented query triple or query quintuple of the passed augmented query. In decision block 602, if all of the augmented query triples have already been selected, then the component continues at block 608, else the component continues at block 603. In block 603, the component selects the next triple of the fact table. In decision block 604, if all the triples have already been selected, then the component loops to block 601 to select the next query quintuple, else the component continues at block 605. In block 605, the component invokes the check candidate component passing the triple and the query quintuple. In decision block 606, if the triple is identified as being a candidate, then the component continues at block 607, else the component loops to block 603 to select the next triple. In block 607, the component saves the bindings of values of the triple to each variable of the query quintuple and then loops to block 603 to select the next triple. In block 608, the component generates the results from the set of bindings saved for each query quintuple of the augmented query.

Figure 7:
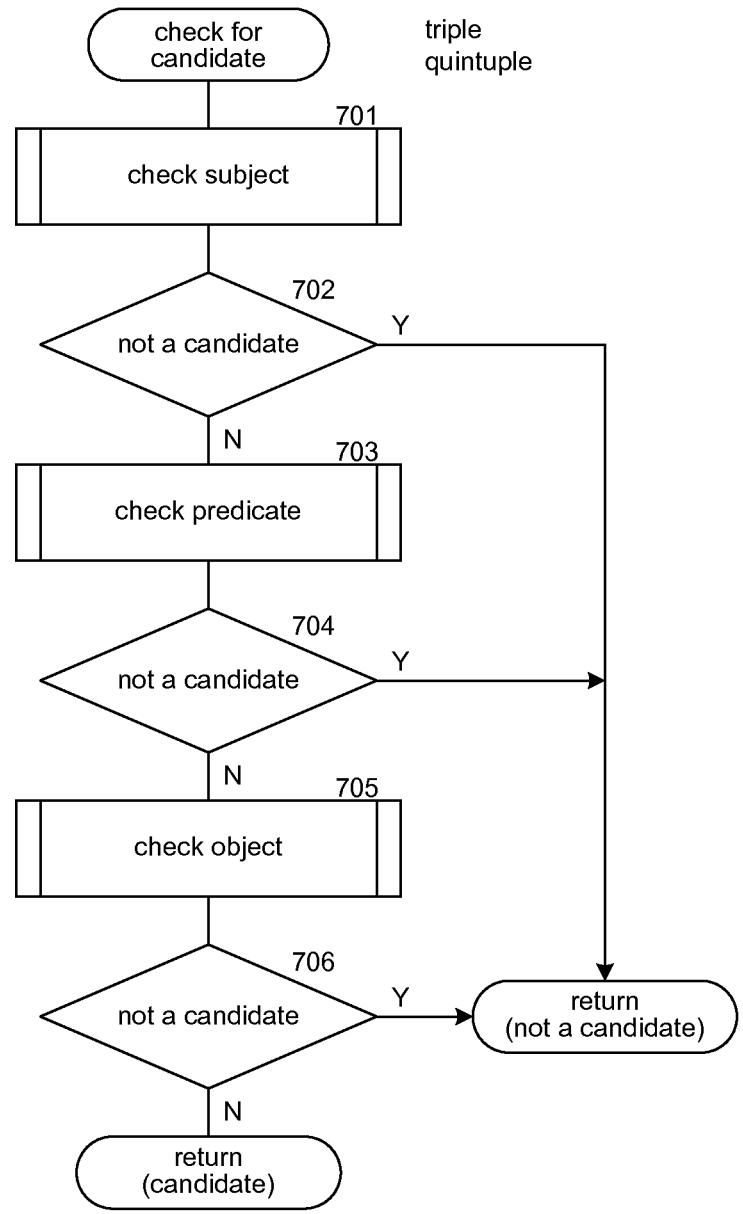
FIG. 7 is a flow diagram that illustrates the processing of a check for candidate component of the search augmentation system in some embodiments.

FIG. 7 is a flow diagram that illustrates the processing of a check for candidate component of the search augmentation system in some embodiments. The component is passed a triple and a query quintuple and determines whether the triple is a candidate for satisfying the augmented query that includes the query quintuple. In block 701, the component invokes the check subject component. In decision block 702, if the triple is not a candidate based on its subject, then the component returns an indication of not a candidate, else the component continues at block 703. In block 703, the component invokes the check predicate component. In decision block 704, if the triple is not a candidate based on its predicate, then the component returns an indication of not a candidate, else the component continues at block 705. In block 705, the component invokes the check object component. In decision block 706, if the triple is not a candidate based on its object, then the component returns an indication of not a candidate, else the component returns an indication of candidate.

Figure 8:
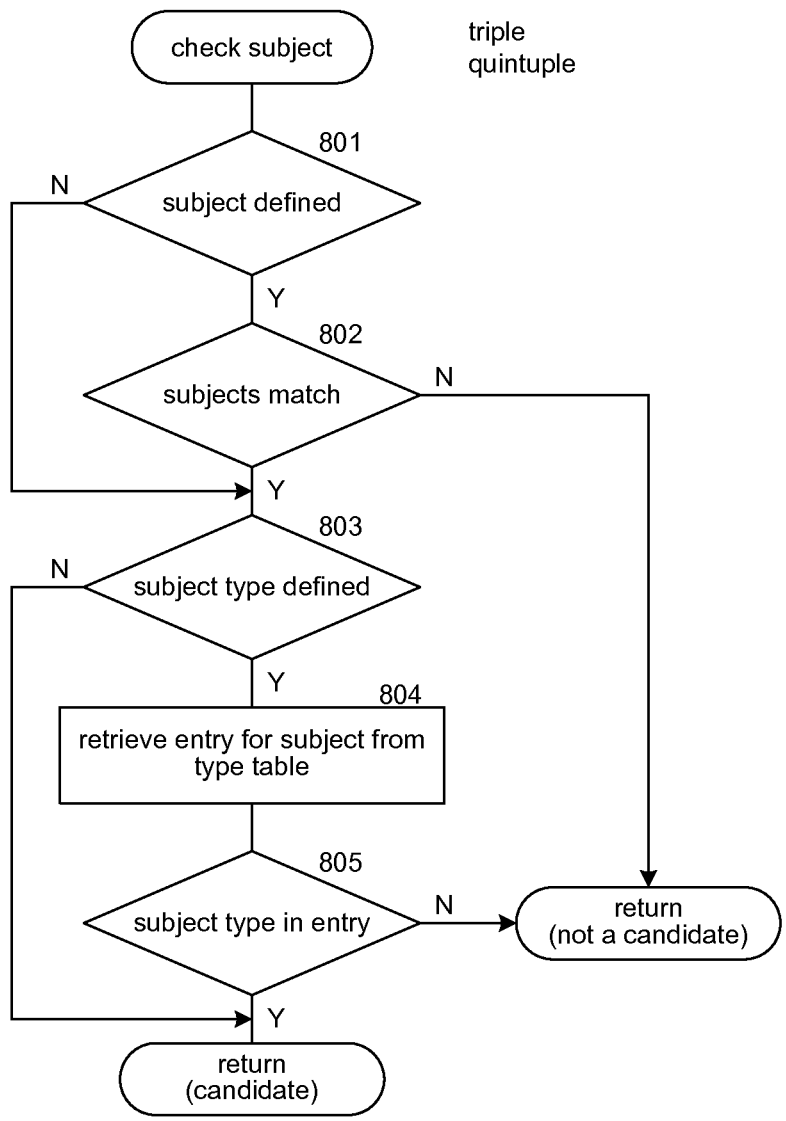
FIG. 8 is a flow diagram that illustrates the processing of a check subject component of the search augmentation system in some embodiments.

FIG. 8 is a flow diagram that illustrates the processing of a check subject component of the search augmentation system in some embodiments. The component is passed a triple and a query quintuple and determines whether the triple is a candidate for satisfying the augmented query that includes the query quintuple based on the subject. In decision block 801, if the subject of the query quintuple is defined (i.e., not a variable), then the component continues at block 802, else the component continues at block 803. In decision block 802, if the subject of the triple matches the subject of the query quintuple, then the component continues at block 803, else the component returns an indication that the triple is not a candidate. In decision block 803, if the subject type of the query quintuple is defined, then the component continues at block 804, else the component returns an indication that the triple is a candidate. In block 804, the component retrieves an entry for the subject of the triple from the type table. In decision block 805, if the type table contains such an entry and the subject type of the query quintuple is in the entry, then the component returns an indication that the triple is a candidate, else the component returns an indication that the triple is not a candidate.

Figure 9:
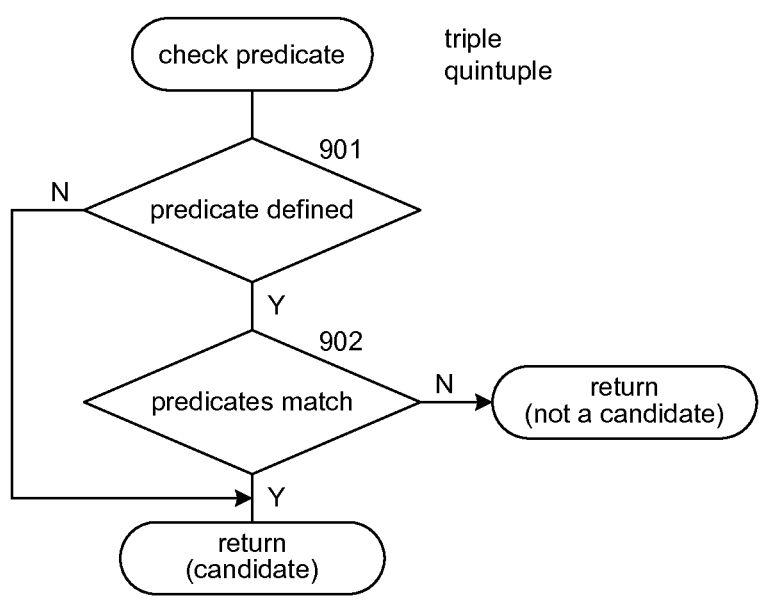
FIG. 9 is a flow diagram that illustrates the processing of a check predicate component of the search augmentation system in some embodiments.

FIG. 9 is a flow diagram that illustrates the processing of a check predicate component of the search augmentation system in some embodiments. The component is passed a triple and a query quintuple and determines whether the triple is a candidate for satisfying the augmented query that includes the query quintuple based on the predicate. In decision block 901, if the predicate of the query quintuple is defined (i.e., not a variable), then the component continues at block 902, else the component returns an indication that the triple is a candidate. In decision block 902, if the predicate of the triple matches the predicate of the query quintuple, then the component returns an indication that the triple is a candidate, else the component returns an indication that the triple is not a candidate.

Figure 10:
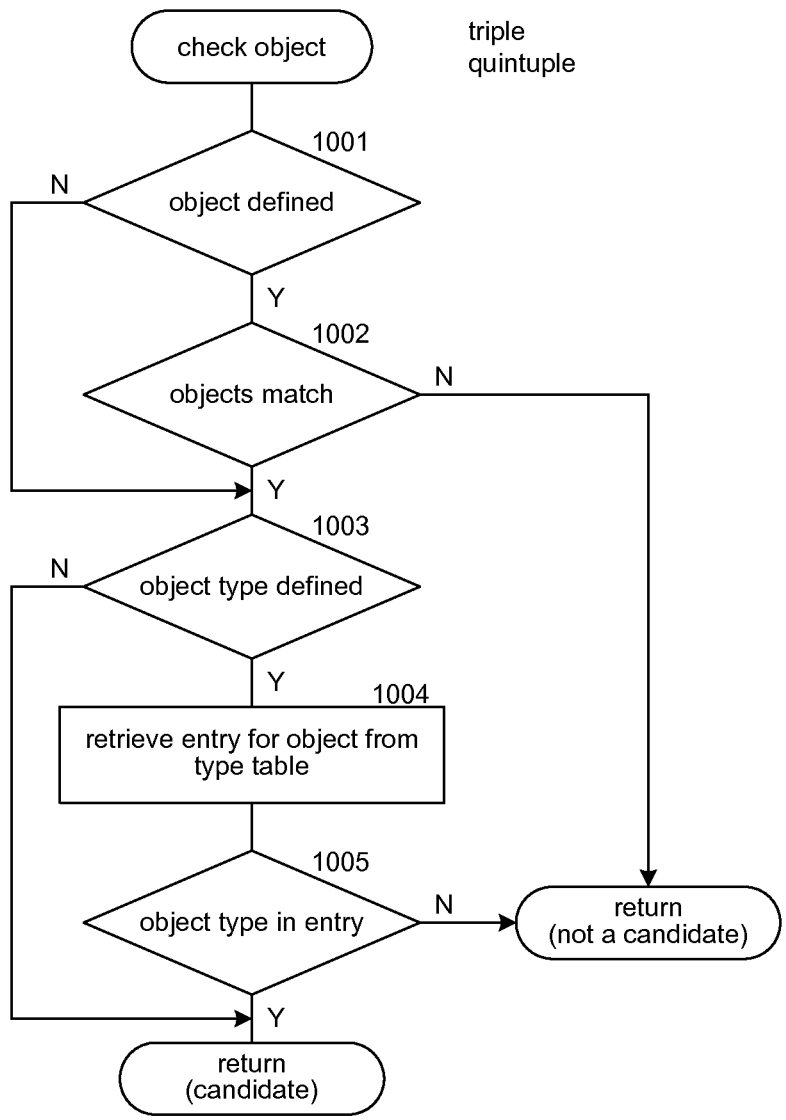
FIG. 10 is a flow diagram that illustrates the processing of a check object component of the search augmentation system in some embodiments.

FIG. 10 is a flow diagram that illustrates the processing of a check object component of the search augmentation system in some embodiments. The component is passed a triple and a query quintuple and determines whether the triple is a candidate for satisfying the augmented query that includes the query quintuple based on the object. In decision block 1001, if the object of the query quintuple is defined (i.e., not a variable), then the component continues at block 1002, else the component continues at block 1003. In decision block 1002, if the object of the triple matches the object of the query quintuple, then the component continues at block 1003, else the component returns an indication that the triple is not a candidate. In decision block 1003, if the object type of the query quintuple is defined, then the component continues at block 1004, else the component returns an indication that the triple is a candidate. In block 1004, the component retrieves an entry for the object of the triple from the type table. In decision block 1005, if the type table contains such an entry and the object type of the query quintuple is in the entry, then the component returns an indication that the triple is a candidate, else the component returns an indication that the triple is not a candidate.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computing system configured to provide results of a received query based on triples, the computing system comprising:
   computer-readable storage storing:
      a fact table having triples, each triple having a subject, a predicate, and an object, the subject and object being entities;
      a type table having a mapping from entities to one or more types of those entities, the type table having one entry for each of a plurality of entities that maps to the one or more types of that entity;
      the received query having one or more non-type query triples and one or more type query triples, each non-type query triple having a subject, a non-type predicate, and an object, and each type query triple having a subject, a type predicate, and an object;
      computer-executable instructions that add to the type table mappings of entities to types corresponding to triples of the fact table that have a type predicate;
      computer-executable instructions that retrieve from the fact table triples that match the one or more non-type query triples;
      computer-executable instructions that, for each retrieved triple, when an entity of the retrieved triple matches the subject of a type query triple and the type table does not have a mapping from the entity of the retrieved triple to the object of that type query triple with the matching subject, exclude the retrieved triple from the results of the received query; and
      computer-executable instructions that provide as the results of the received query the retrieved triples that have not been excluded from the results of the received query; and
   a processor configured to execute the computer-executable instructions stored in the computer-readable storage.

2. The computing system of claim 1 wherein the computer-readable storage includes computer-executable instructions that remove from the fact table triples that have a type predicate.

3. A method performed by a computing system configured to provide results of a received query based on triples, the method comprising:
   accessing by the computing system a fact table having triples, each triple having a subject, a predicate, and an object, the subject and object being entities;
   accessing by the computing system a type table having a mapping from entities to one or more types of those entities, the type table having one entry for each of a plurality of entities that maps to the one or more types of that entity;
   accessing by the computing system the received query having one or more non-type query triples and one or more type query triples, each non-type query triple having a subject, a non-type predicate, and an object, and each type query triple having a subject, a type predicate, and an object;
   adding by the computing system to the type table mappings of entities to types corresponding to triples of the fact table that have a type predicate;
   retrieving by the computing system from the fact table triples that match the one or more non-type query triples;
   for each retrieved triple, when an entity of the retrieved triple matches the subject of a type query triple and the type table does not have a mapping from the entity of the retrieved triple to the object of that type query triple with the matching subject, excluding by the computing system the retrieved triple from the results of the received query; and
   providing by the computing system as the results of the received query the retrieved triples that have not been excluded from the results of the received query.

4. The method of claim 3 further comprising removing by the computing system from the fact table triples that have a type predicate.

* * * * *